United States Patent [19]

Legueu

[11] 3,992,027
[45] Nov. 16, 1976

[54] RIGID CHASSIS FOR AIR TRANSPORTABLE VEHICLE

[76] Inventor: Paul Etienne Rene Legueu, 85, avenue de Mazy, 44380 Pornichet, France

[22] Filed: Dec. 4, 1974

[21] Appl. No.: 529,510

[30] Foreign Application Priority Data
Dec. 7, 1973  France ............... 73.43710

[52] U.S. Cl. .................... 280/106 R; 105/413
[51] Int. Cl.² ........................ B62D 21/00
[58] Field of Search ............. 280/106 R, 106 T; 105/397, 404, 413; 254/166; 267/54 R

[56] References Cited
UNITED STATES PATENTS

| | | | |
|---|---|---|---|
| 1,229,864 | 6/1917 | Batchelder | 254/166 |
| 2,062,233 | 11/1936 | Poirier | 280/106 R |
| 2,240,022 | 4/1941 | Saives | 280/106 R |
| 2,939,719 | 6/1960 | Parker | 280/106 R |
| 2,964,331 | 12/1960 | Sherman | 280/106 R |
| 3,066,950 | 12/1962 | Olson | 280/179 A |
| 3,149,856 | 9/1964 | Schilberg | 280/106 R |
| 3,525,413 | 8/1970 | Kripke | 280/106 R |
| 3,534,977 | 10/1970 | Wessel | 280/106 R |
| 3,820,817 | 6/1974 | Harold | 280/179 A |

*Primary Examiner*—M. H. Wood, Jr.
*Assistant Examiner*—John A. Carroll
*Attorney, Agent, or Firm*—Weiser, Stapler & Spivak

[57] ABSTRACT

The main frame rails of an automotive vehicle are offset at the rear spring mount of the front suspension. This divides them into two portions at different levels, the forward portion being higher than the rear portion.

8 Claims, 2 Drawing Figures

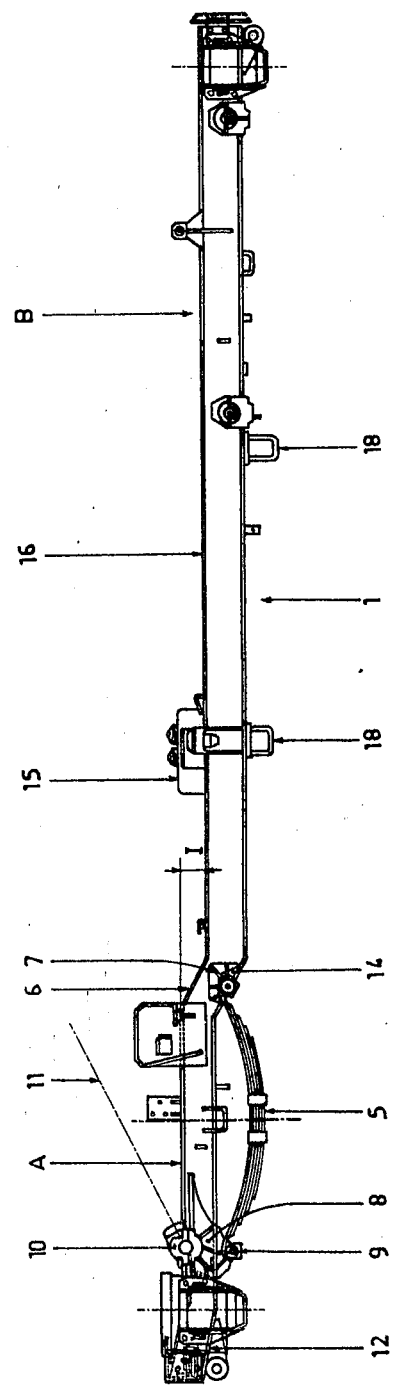

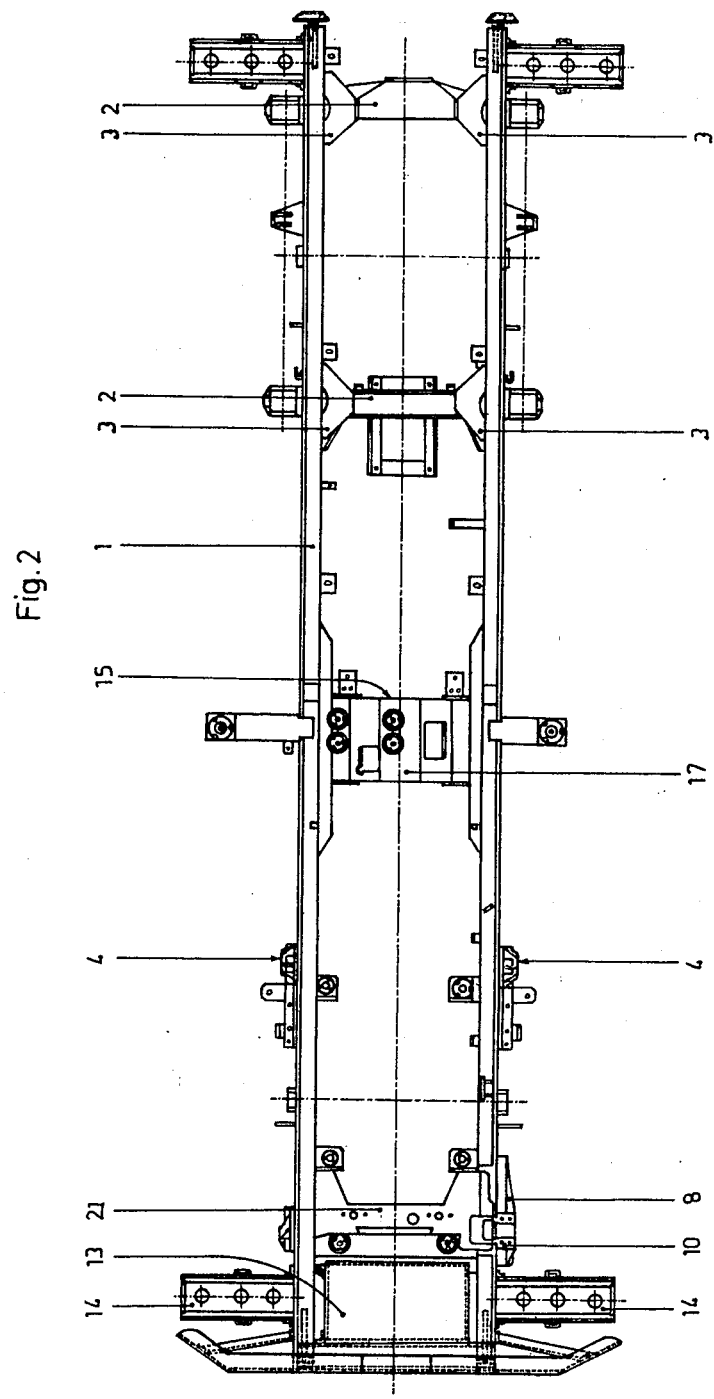

RIGID CHASSIS FOR AIR TRANSPORTABLE VEHICLE

BACKGROUND OF THE INVENTION

The invention relates to a rigid chassis for automotive vehicles and particularly for compact, air transportable vehicles whose dimensions particularly the height are rigorously limited.

Compact, air transportable vehicles are subject to particularly rigid specifications because they must conform to the weight and dimension limitations imposed by the capacity of the cargo planes by which they are transported. Thus, the overall height of the vehicle, in itself, presents serious difficulties because of the necessary clearance of the chassis, the elevated placement of the motor resulting from the axial position of the center of the forward deck, etc. These constraints create an appreciable increase in the overall height of the vehicle which is inconsistent with its application as air transportable vehicle.

SUMMARY OF THE INVENTION

It is accordingly an object of the invention to overcome these difficulties and provide a chassis so constructed that the overall vehicle height does not exceed the limits imposed by its application, while at the same time providing the requisite clearance.

This and other objects which will appear are achieved in accordance with the invention by providing in the main frame rails which are constituted of longitudinal rails and welded transverse members, offsets in the main frame rails at the location of the rear spring mount of the forward vehicle suspension spring. This divides the main frame rails into two portions at different heights, the forward portion being higher than the rear portion.

In a preferred embodiment, the forward mount of the spring of the forward suspension is integral with the steering gear, so that the steering column is located at as low a level as possible and the steering wheel (which constitutes the highest point in the vehicle) is correspondingly lowered.

For further details reference is made to the discussion which follows in the light of the accompanying drawings wherein:

BRIEF DESCRIPTION OF THE DRAWINGS

FIG. 1 is a side elevational view of a chassis embodying the invention; and

FIG. 2 is a top plan view of the embodiment of FIG. 1.

DESCRIPTION OF THE PREFERRED EMBODIMENT OF THE INVENTION

The same reference numerals are used to designate corresponding elements in the two figures.

As shown in the drawings, to which reference may now be had, the rigid chassis consists essentially of two longitudinally extending main frame rails 1 which are parallel to each other and which are connected by a plurality of welded transverse members. In the illustrative example, four transverse members 2 are employed, but it will be appreciated that the invention is not necessarily so limited and more or fewer members could be employed, and still fall within the scope of this invention. These transverse members 2 are provided with gussets 3 of essentially triangular form which are welded to the transverse members 2 and the longitudinal rails 1 to give rigidity to the chassis and particularly to absorb reaction forces in a longitudinal direction from the longitudinal rails.

The longitudinal rails 1 have the distinctive characteristic of being offset at the location of the rear spring mount 4 of the suspension spring 5. These offsets each consist of a transition zone 6 to subdivide the rail and, therefore also the chassis into two portions of different height. The portion A located forwardly of the offset transition zone 6 is higher than the portion B which is located rearwardly of the zone 6. In the illustrative embodiment under consideration, transition zone is inclined at an angle which may be between 20° and 40° from planes drawn through the two portions of the rails. Preferably, an angle of 30° has been found most satisfactory from a viewpoint of strength and utility. The rear spring mount 4 of the front suspension spring 5 is recessed in the transition zone elbow so as to increase the resistance to buckling of the rails 1. The rear spring mount 4 of the front suspension spring 5 is preferably fabricated of hardened steel and is provided with a plurality of stiffening ribs 7 which radiate outwardly from the mount 4 and function to turn it into a particularly strong element. The rails 1 are recessed to receive this spring mount 4 which, after welding becomes an integral part of the rails.

The transition zone 6 is located, not only at the location of the rear spring mount 4 of the forward suspension spring 5, but also at the location of the control pedals (not shown) of the automotive vehicle. This position of the offset transition zone 6 relative to the rails 1 is important, especially for the placement of the gear box (not shown) which, as further discussed below may then be located below the driver's seat. The forward spring mount 8 of suspension spring 5 is also welded to the portion A of the rails and comprises a single piece including both the suspension supporting shaft 9 and also the steering gear shaft 10 of the steering wheel. The fact that the forward portion A of the rails 1 is elevated in effect provides greater clearance with the forward deck. In any case, the unitary construction of the forward spring mount 8, with the steering gear shaft 10 makes it possible to lower the steering box to the greatest extent so that it becomes essentially juxtaposed to the spring mount 8 and the steering wheel no longer exceeds in height the required limits. The fact that this forward spring mount 8 is formed integrally with the steering gear shaft 10 has the advantage of raising only appreciably the level of the steering column 11 (shown in dot and dash lines in FIG. 1) and, with it, all of the accessories which it supports including particularly the steering wheel. Since the steering wheel is the highest point of the vehicle, it becomes even more apparent that there is a considerable advantage in lowering the steering gear and its shaft 10. This feature constitutes a significant improvement in the construction of low profile, compact vehicles suitable for air transport.

The forward extremity 12 of the portion A of the rails is slightly inclined upwardly to obtain the required 45° slope. Thus the cable reel 13 which is schematically indicated in FIG. 2, and the auxiliary fuel can carriers 14 which protrude on opposite sides of the reel 13 have the required ground clearance.

Another feature of the invention resides that the middle transverse member 15 which supports the gear box (not shown) unlike the other transverse members 2, is not flat but rather is upwardly bowed so as to rise above, as shown in FIG. 1, the top surfaces 16 of the longitudinal rails 1. This cross member 15, as seen in the elevation of the chassis is of generally trapezoidal form, the top of the trapezoid 17 being visible in FIG. 2. This cross member 15, protruding above the rails 1, allows elevation of the gear box or transmission (not shown) and its location is such that said box may be placed directly under the driver's seat. This permits easy access to the gear box or transmission, both for maintenance and repair purposes.

The distance I between the two horizontal planes defined between the respective tops of the elevated portion A and the lower portion B provide space for the attachment or insertion of a water or fuel tank (not shown).

Finally, the rails are provided with welded ears 18 which serve as attachment points for ropes or cables used to tie the vehicle down to the floor of a cargo plane. This offset chassis has high mechanical strength and its construction enables it to impart to the vehicle so equipped the required compactness while conforming to the standards applicable to ground clearance and air transport.

It will be understood that the invention is not limited to the specific embodiment described above but may take other forms without departing from the inventive concept. For example, the longitudinal rails of U-shaped cross section may be made in other shapes without affecting the desired results and these same rails may be made of flat reinforced plates or else of other shapes without departing from the inventive concept.

I claim:

1. In an automotive vehicle chassis including a suspension spring having a front mount and a rear mount, the combination of a pair of longitudinal main frame rails connected by cross members, said suspension spring being connected to the rails at the front mount and rear mount, said rails being vertically offset at the location of the rear mount of the suspension spring by an offset transition zone, said offset transition zone dividing the rails into a front portion and a rear portion, said portions being at different heights said rear mount being affixed to the offset transition zone.

2. The chassis according to claim 1 wherein the front portion is higher than the rear portion.

3. The chassis according to claim 1, wherein said offset transition zone is formed by a double elbow connected by the offset transition zone between the two portions of the rails, the angle formed by the offset transition zone being between about 20° to 40° to planes drawn through the front and rear portions.

4. The chassis according to claim 1, wherein the said rear spring mount is incorporated and welded into the said offset transition zone whereby there is no relative movement between the rear spring mount and the main frame rails.

5. The chassis according to claim 1 wherein said front spring mount includes a supporting shaft and is welded to the main frame rails, and a steering gear shaft, the said front spring mount, said supporting shaft and steering gear shaft being integral.

6. The chassis according to claim 5 and a driver's seat mounted above the rails wherein one of said cross members is convex and extends above the upper surface of the rear portion of the rails, said cross member being placed to support a gear box, said gear box being positioned relative to the rear portion in a location under the driver's seat.

7. The chassis according to claim 1, wherein the offset transition zone is recessed and wherein the rear spring mount is affixed to the rails within the recess.

8. The chassis according to claim 7 and stiffening ribs extending from the rear spring mount to the main frame rails within the recess to strengthen the chassis at the place of connection.

* * * * *